US008839903B2

(12) United States Patent
Markfort

(10) Patent No.: US 8,839,903 B2
(45) Date of Patent: Sep. 23, 2014

(54) STEERING WHEEL FOR A MOTOR VEHICLE

(75) Inventor: Dieter Markfort, Berlin (DE)

(73) Assignee: Takata AG, Aschaffenburg (DE)

( * ) Notice: Subject to any disclaimer, the term of this patent is extended or adjusted under 35 U.S.C. 154(b) by 0 days.

(21) Appl. No.: 14/003,752

(22) PCT Filed: Mar. 8, 2012

(86) PCT No.: PCT/EP2012/054001
§ 371 (c)(1),
(2), (4) Date: Sep. 6, 2013

(87) PCT Pub. No.: WO2012/120079
PCT Pub. Date: Sep. 13, 2012

(65) Prior Publication Data
US 2014/0000976 A1 Jan. 2, 2014

(30) Foreign Application Priority Data

Mar. 9, 2011 (DE) .......................... 10 2011 005 309
Apr. 19, 2011 (DE) ...................... 20 2011 005 545 U

(51) Int. Cl.
*B62D 5/04* (2006.01)
*B62D 5/00* (2006.01)
*B62D 1/10* (2006.01)

(52) U.S. Cl.
CPC .............. B62D 5/0454 (2013.01); B62D 5/008 (2013.01); B62D 1/10 (2013.01)
USPC .......................................... 180/444; 180/443

(58) Field of Classification Search
CPC ...... B62D 5/04; B62D 5/0409; B62D 5/0448; B62D 5/0463; B62D 5/0468

USPC .......................................... 180/443, 444, 446
See application file for complete search history.

(56) References Cited

U.S. PATENT DOCUMENTS 6,053,270 A * 4/2000 Nishikawa et al. ........... 180/168
7,648,004 B1 * 1/2010 Larouche et al. ............. 180/443
(Continued)

FOREIGN PATENT DOCUMENTS

DE 10 2006 028 267 A1 1/2008
DE 10 2006 028 269 A1 1/2008
(Continued)

OTHER PUBLICATIONS

International Search Report from the International Bureau of WIPO for International Application No. PCT/EP2012/054001 dated Jun. 21, 2012 (3 pages) and an English translation of the same (3 pages).

Primary Examiner — Joseph M Rocca
Assistant Examiner — Marc A Scharich
(74) Attorney, Agent, or Firm — Fitch, Even, Tabin & Flannery LLP

(57) ABSTRACT

A steering wheel for a motor vehicle is provided. In one form, the steering wheel includes: a steering wheel rim, via which the steering wheel can be actuated by a driver of the motor vehicle for generating a steering angle, a superposition drive for generating a steering angle which can be superimposed with a steering angle generated by actuating the steering wheel rim, a locking means different from the superposition drive, with which the superposition drive can be locked by mechanical action and bearing means, by means of which a housing of the locking means is elastically mounted on a housing of the superposition drive such that it can carry out a compensating movement relative to the housing of the superposition drive.

12 Claims, 6 Drawing Sheets

(56) References Cited

U.S. PATENT DOCUMENTS

| | | | |
|---|---|---|---|
| 8,002,075 B2* | 8/2011 | Markfort | 180/443 |
| 8,230,964 B2* | 7/2012 | Markfort | 180/444 |
| 2006/0042861 A1* | 3/2006 | Ovshinsky | 180/443 |
| 2006/0149446 A1* | 7/2006 | Nelson | 701/41 |
| 2007/0034442 A1 | 2/2007 | Inoue | |
| 2008/0141814 A1 | 6/2008 | Markfort | |
| 2008/0277190 A1* | 11/2008 | McCord et al. | 180/444 |
| 2011/0056762 A1* | 3/2011 | Markfort | 180/444 |
| 2011/0088963 A1 | 4/2011 | Markfort | |
| 2012/0024617 A1 | 2/2012 | Markfort et al. | |

FOREIGN PATENT DOCUMENTS

| | | |
|---|---|---|
| EP | 1 747 970 A1 | 1/2007 |
| WO | 2007/009420 A1 | 1/2007 |
| WO | 2009/138462 A1 | 11/2009 |
| WO | 2010/115707 A1 | 10/2010 |

\* cited by examiner

STEERING WHEEL FOR A MOTOR VEHICLE

CROSS-REFERENCE TO RELATED APPLICATIONS

This application is a National Phase Patent Application of International Patent Application Number PCT/EP2012/054001, filed on Mar. 8, 2012, which claims priority of German Patent Application Number 10 2011 005 309.3, filed on Mar. 9, 2011, and of German Utility Model Application Number 20 2011 005 545.0, filed on Apr. 19, 2011, which are hereby incorporated herein by reference in their entirety.

BACKGROUND

This invention relates to a steering wheel for a motor vehicle.

From the prior art, steering wheels which realize a superposition steering system are known. Such steering wheels include a superposition drive for generating a steering angle which is superimposed with a steering angle generated by the driver by actuating the steering wheel rim of the steering wheel, so that a rotary movement of a steering shaft connected with the steering wheel is composed of the steering angle generated by the driver and the steering angle generated by the superposition drive. For example, a steering wheel with superposition drive is known from WO 2007/009420 A1.

Furthermore, a locking means for locking a superposition drive of a steering wheel is known from WO 2010/115707 A1.

SUMMARY

The problem underlying the invention consists in creating a steering wheel with a rather reliable locking means for locking a superposition drive of the steering wheel.

According to an exemplary embodiment of the invention, there is provided a steering wheel for a motor vehicle, comprising
  a steering wheel rim, via which the steering wheel can be actuated by a driver of the motor vehicle for generating a steering angle;
  a superposition drive for generating a steering angle which can be superimposed with a steering angle generated by actuating the steering wheel rim;
  a locking means different from the superposition drive, with which the superposition drive can be locked by mechanical action; and
  bearing means, by means of which a housing of the locking means is elastically mounted on a housing of the superposition drive such that it can perform a compensating movement relative to the housing of the superposition drive.

Due to the elastic bearing of the housing of the locking means on the housing of the superposition drive, a (limited) relative movement (compensating movement) of the locking means relative to the superposition drive thus becomes possible, when the locking means mechanically acts on the superposition drive, i.e. during the locking operation, after the locking operation, or while canceling the locking. Due to this bearing of the locking means, e.g. the occurrence of vibrations and noise is counteracted and/or manufacturing tolerances are compensated. Furthermore, due to the elastic bearing of the locking means the locking operation largely is effected while preserving material for the components of the superposition drive and of the locking means involved in the locking operation.

The fact that the locking means is said to be different from the superposition drive in particular means that the locking means is formed separate from those components of the superposition drive which generate the additional steering angle; i.e. in particular that the locking means is not formed by a self-locking configuration of the superposition drive. The locking means therefore can cooperate with a self-locking or a not self-locking superposition drive. It should also be mentioned that the wording according to which the locking means is elastically "mounted" on the superposition drive means that a compensating movement is possible both in a release position of the locking means, in which the locking means does not act on the superposition drive, and in a locking position, in which the locking means acts on the superposition drive, i.e. an elastic bearing of the locking means does exist not only in the locking position.

The superposition drive in particular includes a drive worm meshing with a worm gear and arranged in its housing, wherein the locking means is arranged on a portion (abutment portion) of the housing of the superposition drive and is elastically mounted on the abutment portion by means of the bearing means. For example, the worm gear also is arranged in the housing of the superposition drive. In addition, an actuator (for example an electric motor) for driving the drive worm can be arranged (in particular fixed) on the housing of the superposition drive. The housing of the superposition drive also can include connecting structures (e.g. mounting openings) for connecting the superposition drive with the steering wheel.

Furthermore, the locking means can include a locking element for mechanically locking the superposition drive as well as an actuator arrangement for moving the locking element from a release position into a locking position or vice versa, wherein in the release position it does not influence the movement of the superposition drive and in the locking position locks the superposition drive by mechanical action. In the locked condition of the superposition drive, a steering angle (i.e. a rotary movement of the steering shaft) can be generated by a torque alone, which is introduced by the driver actuating the steering wheel rim. The locking element is formed e.g. oblong (in particular in the form of a bolt).

In particular, the actuator arrangement comprises an actuator (e.g. an electromagnet, an electric motor or a pneumatic drive) separate from the actuator for driving the drive worm and e.g. also elastic means (e.g. a compression or tension spring), which cooperate with the locking element. The locking element and the actuator arrangement are arranged e.g. in a common housing of the locking means. The housing of the locking means, in which e.g. the locking element and/or the actuator arrangement are arranged (and e.g. also the housing of the superposition drive), is formed e.g. of a plastic material (in particular integrally). In addition, means for the antistatic shielding of the housing of the locking means and/or the housing of the superposition drive can be provided.

In accordance with one exemplary aspect of the invention, the housing of the locking means is arranged on a abutment portion of the housing of the superposition drive.

The locking element in particular cooperates with an element rotatable with the drive worm of the superposition drive (i.e. non-rotatably connected with the drive worm) such that it locks the rotatable element in the locking position by frictional and/or positive connection. Due to this frictional and/or positive connection, a force is introduced into the locking means (in particular into its housing) via the locking element, which due to the elastic bearing of the locking means causes a compensating movement of the locking means relative to the housing of the superposition drive. Due to this compensating movement, e.g. loads of the superposition drive (in particular of the drive worm or of the actuator for driving the drive worm) and of the locking means (in particular of the locking element and the rotatable element), which can lead to damages in particular at high speeds, are avoided or at least largely reduced. A compensating movement of the locking means also can be obtained by a steering movement of the driver with locked locking means.

As will be described in more detail below, the locking means in particular includes a locking disk as rotatable element, which in the region of its outer edge includes cutouts into which the locking element engages in the locking position and blocks a rotation of the drive worm.

As mentioned, the housing of the locking means is elastically mounted via the bearing means in particular on a abutment portion of the housing of the superposition drive. For example, the bearing means comprise at least one elastic element which is arranged between the housing of the superposition drive, in particular its abutment portion, and the housing of the locking means. For example, the elastic element is formed in the form of at least one layer of an elastic material (for example of an elastic plastic material), which is arranged e.g. between the abutment portion of the superposition drive housing and the housing of the locking means, wherein the layer with one side rests against the abutment portion of the superposition drive housing and with a side facing away from the superposition drive housing against the housing of the locking means. The abutment portion of the housing of the superposition drive in particular also represents a guide surface for the compensating movement of the locking means when loaded during the locking operation.

In accordance with another exemplary aspect of the invention, the bearing means include at least one elastic element which is arranged between the actuator of the locking means and an inside of the housing of the locking means. For example, the elastic element here is at least one elastic layer which extends between the actuator and the housing of the locking means. The actuator also can be arranged in a separate housing, wherein the elastic element (or the plurality of elastic elements) then is located between this actuator housing and the inside of the housing of the locking means. Worded more generally, it is also possible that bearing means are provided, which provide for a compensating movement of the locking element relative to the housing of the locking means, for example in the form of at least one elastic element which is located between the actuator of the locking means and the housing of the locking means. This variant also can be realized independent of the elastic bearing of the locking means, which provides for a compensating movement of the locking means relative to the superposition drive.

Furthermore, it is conceivable that the locking means is fixed on the superposition drive via at least one fastening element which reaches through a cutout in the housing of the locking means. In particular, the bearing means here comprise at least one elastic element which extends between the fastening element and an inside of the cutout facing the fastening element. The fastening element in particular is guided as elastic element in an elastic sleeve (i.e. a hollow cylindrical element) arranged in the cutout, wherein the cutout is formed in the form of a through bore in the housing of the locking means. The fastening element is e.g. a screw which is guided through the elastic sleeve and which is screwed into a portion of the housing of the superposition drive. Of course, other types of fastening elements can also be used, e.g. rivets.

The through bore in the housing of the locking means in particular has a larger inside diameter as compared with the outside diameter of the fastening element, so that the elastic sleeve can extend between the fastening element and the inside of the through bore. Furthermore, a plurality of fastening elements mounted via an elastic sleeve can of course be present, e.g. all fastening elements via which the housing of the locking means is connected with the housing of the superposition drive can also be mounted elastically, e.g. by means of an elastic sleeve.

In accordance with a further exemplary aspect of the invention the locking means, as already mentioned above, includes a rotatable element coupled with the superposition drive, with which the locking element mechanically cooperates in the locking position such that it locks the superposition drive. There can be provided at least two fastening elements which each extend through a cutout in the housing of the locking means, wherein between the fastening element located closer to the rotatable element—as seen in direction of the locking element—and the cutout reached through this fastening element an elastic element of the bearing means is arranged, but not between the fastening element located further away from the rotatable element and the cutout reached through by this fastening element.

Thus, the locking means is elastically mounted only on the fastening element located closer to the rotatable element, but not on the fastening element located further away. The reverse case also is possible in principle, namely that the locking means is elastically mounted on the fastening element located further away from the rotatable element and not on the one located more closely. It should also be noted that even more than two fastening elements can be present and the locking means can elastically be mounted on more than one fastening element, wherein one (in particular exactly one) fastening element, however, is not provided for the elastic bearing.

For example, as already mentioned above, the fastening elements each are a screw or a rivet, which each reach through a through bore in the housing of the locking means.

Due to the fact that a fastening element is not provided for the elastic bearing (but e.g. only the fastening element located closer or closest to the rotatable element), a compensating movement of the locking means (and hence of the locking element) in the form of a swivel movement about the axis of the fastening element not provided for the elastic bearing, in particular in a plane parallel to the abutment portion representing a planar guide surface, will occur due to the mechanical contact between the locking element and the rotatable element, when the locking element is moved from the release position into the locking position.

It is also conceivable that the locking means is fixed (elastically mounted) on the abutment portion of the housing of the superposition drive via all fastening elements each provided with an elastic element. When moving the locking element into its locking position, a compensating movement of the locking means thereby becomes possible, which can point in all directions parallel to an abutment portion representing a planar guide surface. For example, the two fastening elements are arranged symmetrical to a plane in which the main direction of extension of the locking element and the axis of the drive worm are located and thus have the same distance to the rotatable element. The "main direction of extension" of the locking element is that direction in which the locking element has its greatest extension. For example, with an oblong locking element the main direction of extension extends along its longitudinal axis.

It is of course also possible that the locking means is elastically mounted on the superposition drive such that it can perform both a rotatory and a linear compensating movement, wherein e.g. a resulting movement results from a superposition of the two forms of movement. For example, the abutment portion of the housing of the superposition drive extends in a curved manner, e.g. in the form of a segment of a circular cylinder, and the locking means is connected with the abutment portion via two fastening elements (arranged for example with the same distance to the rotatable element) each extending in an elastic sleeve, so that both a swivel movement along the curved surface of the abutment portion (i.e. around the axis of the drive worm of the superposition drive) and a movement along the axis of the drive worm is possible.

A purely linear compensating movement might be generated e.g. by an elastic bearing of the locking means on all fastening elements and simultaneously providing specially designed guide elements. Furthermore, it is conceivable that, as already indicated above, a (likewise planar) elastic layer extends between the planar abutment portion.

In accordance with a further exemplary aspect of the invention the housing of the superposition drive includes a holding portion extending obliquely or transversely (vertically) to the longitudinal axis of the drive worm, in which a cutout is formed, into which a portion of the housing of the locking means protrudes, wherein the bearing means comprise at least one elastic element which is arranged between the holding portion and the portion of the housing of the locking means protruding into the cutout.

The cutout in the holding portion is formed e.g. rectangular, wherein the invention is of course not limited to a particular geometry of the cutout. For example, the cutout in the holding portion can also be formed circular. The elastic element in particular extends between the edge of the cutout and an outside of the portion of the housing of the locking means protruding into the cutout, wherein the elastic element e.g. completely surrounds the protruding portion, i.e. it extends along the entire edge of the cutout. However, this is not absolutely necessary; it is also conceivable that the elastic element extends only along a part of the edge of the cutout.

Furthermore, the housing of the superposition drive can include a connecting portion extending obliquely or transversely (vertically) to the longitudinal axis of the drive worm, wherein the bearing means comprise at least one elastic element via which a portion of the housing of the locking means rests on the connecting portion. In particular, the connecting portion is formed at least approximately cylindrical (dome-like), wherein the elastic element is located between an end face of the connecting portion and the housing of the locking means.

In particular, in the portion of the housing of the locking means resting on the connecting portion a cutout is formed, through which a fastening element (see above) reaches, via which the locking means is fixed on the superposition drive. The bearing means comprise e.g. at least one further elastic element which extends between the fastening element and an inside of the cutout facing the fastening element. Suitable elastic elements for this purpose have already been explained above.

The drive worm of the superposition drive in particular is oriented parallel to the main direction of extension of the locking element (i.e. in particular parallel to the longitudinal axis of the locking element). It is, however, also conceivable that the axis of the drive worm extends obliquely to the main direction of extension of the locking element. For example, the abutment portion of the housing of the superposition drive is formed curved in the form of a segment of a hollow cone (e.g. a straight circular cone), wherein the axis of the cone coincides e.g. with the axis of the drive worm.

In addition, it is possible that the drive worm of the superposition drive is elastically mounted in the housing of the superposition drive via the bearing means, in particular via at least one elastic element extending between the drive worm and an inside of the housing (e.g. sleeve-like).

BRIEF DESCRIPTION OF THE DRAWINGS

The invention will subsequently be explained in detail by means of exemplary embodiments with reference to the Figures.

DETAILED DESCRIPTION

Figure 1:
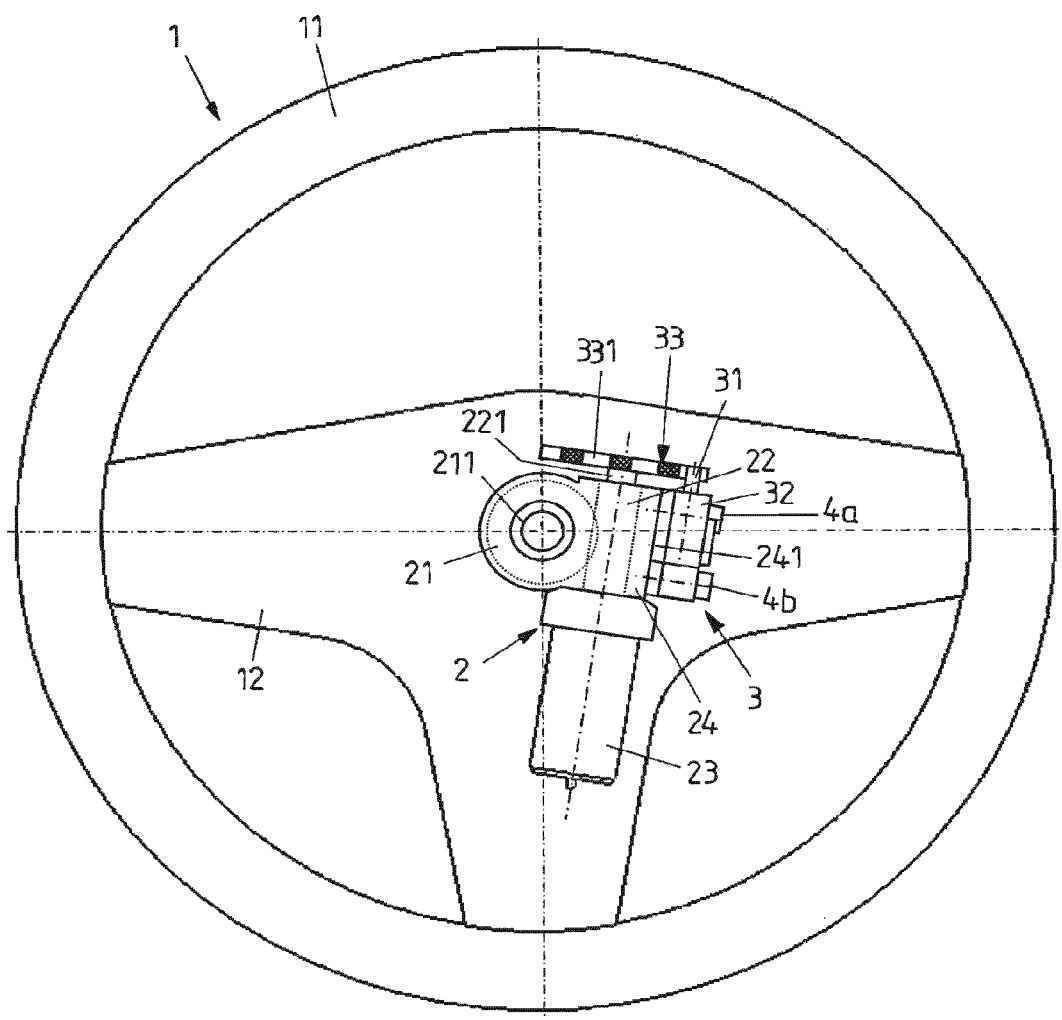
FIG. 1 shows a steering wheel according to an exemplary embodiment of the invention in a top view as seen from a side facing away from a driver.

The steering wheel 1 according to the invention as shown in FIG. 1 includes a steering wheel rim 11, via which a driver of the motor vehicle can rotate the steering wheel and thus impose a steering angle on a steering shaft connected with the steering wheel. The steering wheel 1 furthermore includes a superposition drive 2 with which an additional steering angle can be imposed on the steering shaft, which is superimposed on the steering angle introduced into the steering shaft by rotating the steering wheel rim.

The superposition drive 2 in particular is arranged on a side of spokes 12 of the steering wheel 1 facing away from the driver, which spokes connect the steering wheel rim 11 with a central steering wheel hub, in the region of this central steering wheel hub and includes a drive worm 22 meshing with a worm gear 21. The worm gear 21 is coupled with the steering shaft of the vehicle via a tab 211 which protrudes from a housing 24 of the superposition drive, so that a rotary movement of the worm gear is transmitted to the steering shaft. The drive of the drive worm 22 is effected via an actuator 23, which in particular is formed in the form of an electric motor. A possible configuration of the superposition drive and its attachment to the steering wheel and with the steering shaft are described e.g. in WO 2010/11 57 07 A1, to which reference in so far is made expressly.

The steering wheel 1 furthermore includes a locking means 3 separate from the superposition drive 2, which serves to lock the superposition drive by mechanical action; for example to ensure a safe introduction of a steering angle into the steering shaft by a torque applied by the driver via the steering wheel rim 11 in the case of a failure of the superposition drive or in its non-active condition.

The locking means 3 includes a locking element in the form of a locking bolt 31, which via an (e.g. electromagnetic) actuator is axially movable from a release position into the locking position shown in FIG. 1. The actuator of the locking means 3 and of the locking bolt 31 is located in the interior of a housing 32, wherein in the locking position a portion of the locking bolt 31 protrudes from an opening 3220 of the housing 32, wherein the opening 3220 can serve as guide for the locking bolt, i.e. the locking bolt can rest against the edge of the opening. It is, however, also possible that additional means for guiding the locking bolt 31 are provided, e.g. a sleeve (indicated by dashed contour) arranged separate from the housing 32 (in particular in the opening 3220). The housing 32 is attached to a flange-like abutment portion 241 of a housing 24 of the superposition drive, to which reference will be made in detail below in connection with FIGS. 3A and 3B.

In its locking position, the locking bolt 31 cooperates with a rotatable element in the form of a locking disk 33, wherein the locking disk 33 is non-rotatably coupled with a free end 221 of the drive worm 22 protruding from the housing 24 of the superposition drive. Along its outer circumference, the locking disk 33 also includes cutouts 331 into which a free end of the locking bolt 31 reaching out of the housing 32 of the locking means 3 engages and most of all positively locks the locking disk 33, so that the drive worm 22 coupled with the locking disk also is blocked. It should be noted that the locking means also can include other means for mechanically acting on the superposition drive. For example, a holding element can be provided, which can be put against the drive worm, in order to lock the same by frictional contact.

For moving the locking bolt 31 into the locking position, the free end of the locking bolt is brought in mechanical contact with the locking disk 33, i.e. a force is introduced into the locking bolt, which can lead to e.g. vibrations which propagate onto the steering wheel rim 11 via the spokes 12 of the steering wheel. To suppress such vibrations as far as possible, the steering wheel includes bearing means via which the locking means 3 is elastically mounted on the superposition drive. This elastic bearing will be explained in detail with reference to FIGS. 3A and 3B as well as 4A and 4B.

Figure 2:
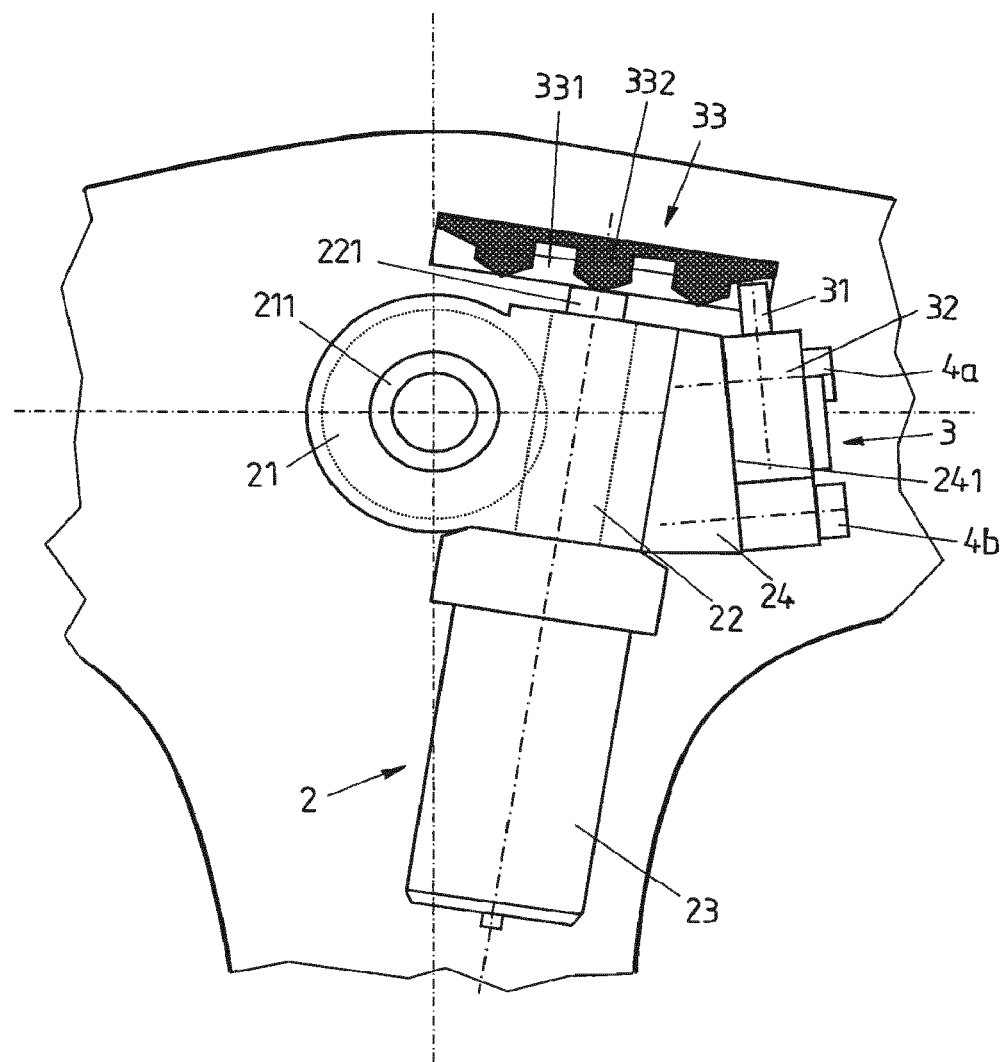
FIG. 2 shows an enlarged representation of a superposition drive of a steering wheel according to a second exemplary embodiment of the invention.

In the exemplary embodiment of FIG. 1, the cutouts 331 of the locking disk are formed in the form of through openings. FIG. 2 shows a slightly different design of the locking disk 33, according to which the cutouts 331 extend from a side facing the locking bolt 31 only down to a specifiable depth of the locking disk 33, i.e. are not formed continuously. In addition, portions 332 of the locking disk 33, which extend between the cutouts 331, include a partial region facing the locking bolt 31 (or the drive worm 22), which tapers towards the drive worm 22, in order to facilitate running of the free end of the locking bolt 31 into one of the cutouts 331. For example, the tapering partial region of the portions 332 is beveled in a roof-like manner, wherein the bevels extend in direction of the adjacent cutouts 331.

In the exemplary embodiment of FIG. 2, the drive worm 22 and the locking means 3 furthermore are not arranged parallel, but inclined to each other. More exactly, the axis of the drive worm 22 and the longitudinal axis of the locking bolt 31 extend at an acute angle to each other. Correspondingly, the abutment surface 241, via which the housing 32 of the locking means 3 rests against the housing 24 of the superposition drive 2, also is formed inclined to the axis of the drive worm 22. It is also conceivable that the abutment surface 241 extends with a curvature, for example in the form of a segment of a straight circular cone, wherein the surface of the housing 32 of the locking means 3, which rests against this abutment surface, is formed with a corresponding complementary curvature.

It is of course also possible that the oblique orientation of worm gear and locking bolt relative to each other as well as the bevels of the locking disk 33 are used in the exemplary embodiment of FIG. 1, i.e. together with the locking disk 33 shown there, which includes continuous cutouts 331. Furthermore, it should be noted that according to the exemplary embodiment of FIG. 3A the axes of rotation of the worm gear 21 and the drive worm 22 are oriented vertically to each other. However, this is not absolutely necessary, but other orientations of drive worm and worm gear relative to each other can of course also be provided.

Figure 3A:
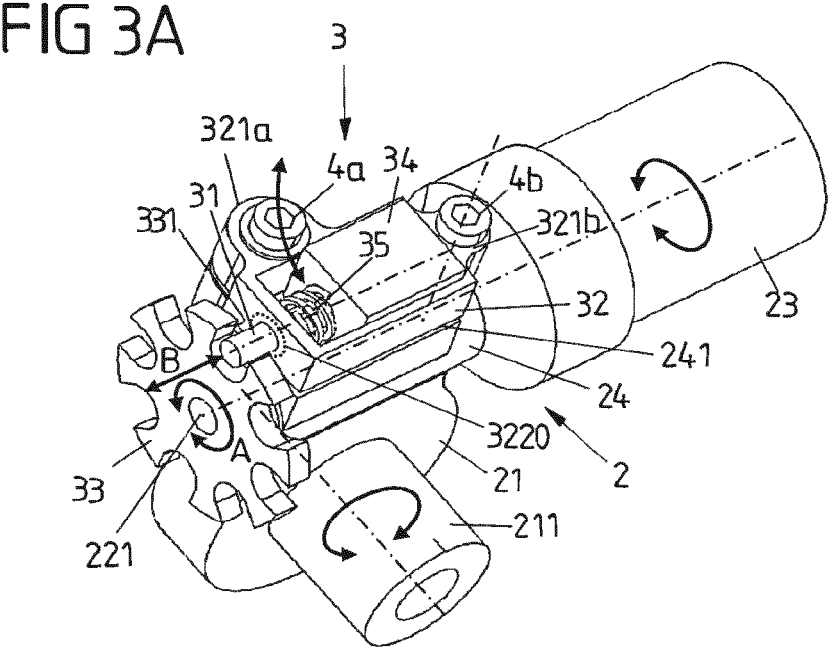
FIG. 3A shows the superposition drive of the steering wheel of FIG. 1 in a perspective representation.
Figure 3B:
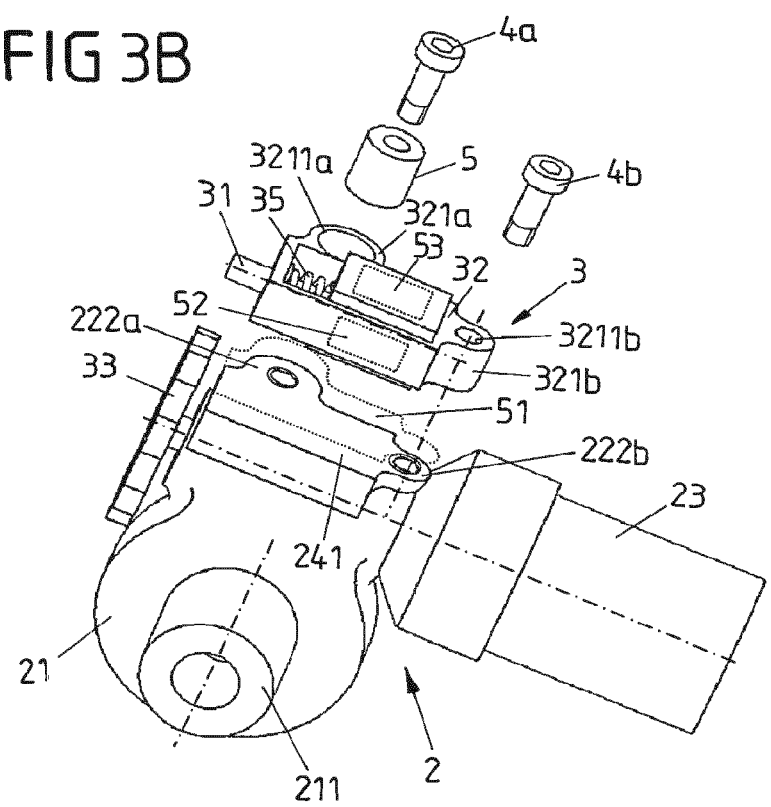
FIG. 3B shows the superposition drive of the steering wheel of FIG. 3A in a perspective exploded representation.

FIG. 3A shows the superposition drive 2 together with the locking means 3 of FIG. 1 in a perspective representation, FIG. 3B in an exploded representation. In FIGS. 3A and 3B the housing 32 of the locking means 3 is shown half open, in order to show the components of the locking means 3 present in the interior of the housing 32. The housing 32, however, normally is designed closed, in particular such that it rather tightly encloses the components present in the interior of the housing, e.g. to achieve a rather good noise damping and/or to avoid soiling of the components.

The locking means 3, as already mentioned above, includes an actuator 34 in the interior of the housing 32 as part of an actuator arrangement for moving the locking bolt 31 along its longitudinal direction (arrow B). In particular, the actuator 34 is formed in the form of an electromagnetic means (similar to a relay), wherein the actuator 34 is arranged in a separate housing which is enclosed by the outer housing 32 of the locking means 3. It is, however, of course not absolutely necessary that the actuator is accommodated in a separate, additional housing.

Furthermore, the actuator arrangement of the locking means 3 includes a compression spring 35 likewise arranged in the housing 32, which has the tendency to hold the locking bolt 31 in engagement with the locking disk 33, i.e. in locking position. On activation of the actuator 34, the fixing bolt 31 then is moved into the release position against the restoring force of the spring 35 and hence is brought out of engagement with the locking disk 33. This means that the locking means 3 performs its function, namely to lock the superposition drive 2, in its deactivated condition. The actuator 34 in particular is activated (energized) via an electrical signal of the vehicle (in particular an ECU). It is also conceivable that with a corresponding design a tension spring is used instead of a compression spring, which also holds the locking bolt in the locking position before activation, and on activation the locking bolt is moved into the release position. Furthermore, it is possible that before the deactivation or along with the deactivation of the locking means 3 (i.e. of the actuator 34) the superposition drive 2 likewise is deactivated, i.e. the energization of the actuator which drives the drive worm is interrupted.

The housing 32 of the locking means 3 includes two bulges 321a, 321b, in which through openings 3211a, 3211b are located, through which a fastening element in the form of a screw 4a, 4b each extends. The screws 4a, 4b are screwed into correspondingly formed connecting regions 222a, 222b of the abutment portion 241 of the housing 24 of the superposition drive 2, so that the housing 32 of the locking means 3 is fixed on the housing 24 of the superposition drive 2 and with one side rests against the abutment portion 241.

The front one of the two through bores (i.e. the bore 3211a arranged closer to the locking disk 33) has an inside diameter which is substantially greater than the outside diameter of the screw 4a reaching through the bore 3211a. The reason is that an elastic sleeve 5 is inserted into the through bore 3211a as bearing means, through which the shaft of the screw 4a extends, so that via the elastic sleeve 5 an elastic bearing of the locking means 3 is realized on the superposition drive 2. Alternatively or in addition, the bearing means can include further elastic elements, e.g. an elastic element 51 designed substantially planar (dashed contour in FIG. 3B), which extends between the abutment surface 241 of the housing 24 of the superposition drive 2 and the housing 32 of the locking means 3. In addition, elastic elements 52, 53 also can be provided in the interior of the housing 32 of the locking means 3, which for example are located between the housing of the actuator 34 and an inside of the outer housing 32 of the locking means 3 (likewise indicated by dashed contours in FIG. 3B).

The locking means is not elastically mounted on the rear fastening screw 4b, i.e. on that one of the two screws 4a, 4b which has the greater distance to the locking disk 33 along the locking bolt 31, i.e. no elastic element extends between the shaft of the screw 4b and the inside of the through bore 3211b. In particular, the rear screw 4b reaches through the rear through opening 3211b with a precise fit (with only little clearance). This results in that, when the locking bolt 31 is brought in engagement with the locking disk 33, so that a mechanical contact occurs between the locking bolt 31 and the locking disk 33 and thus an introduction of force into the locking bolt 31, in particular vertical to its longitudinal axis, the sleeve 5 is deformed and the housing 32 performs a compensating movement in the form of a swivel movement about the longitudinal axis of the rear screw 4b. The compensating movement here is effected parallel to the abutment surface 241.

It is of course also conceivable that the rear fastening screw 4b also is guided in an elastic sleeve analogous to the front fastening screw 4a, so that the locking means 3 in principle can perform an arbitrary compensating movement along the plane of the abutment surface 241 of the housing 24 of the superposition drive 3.

Figure 4A:
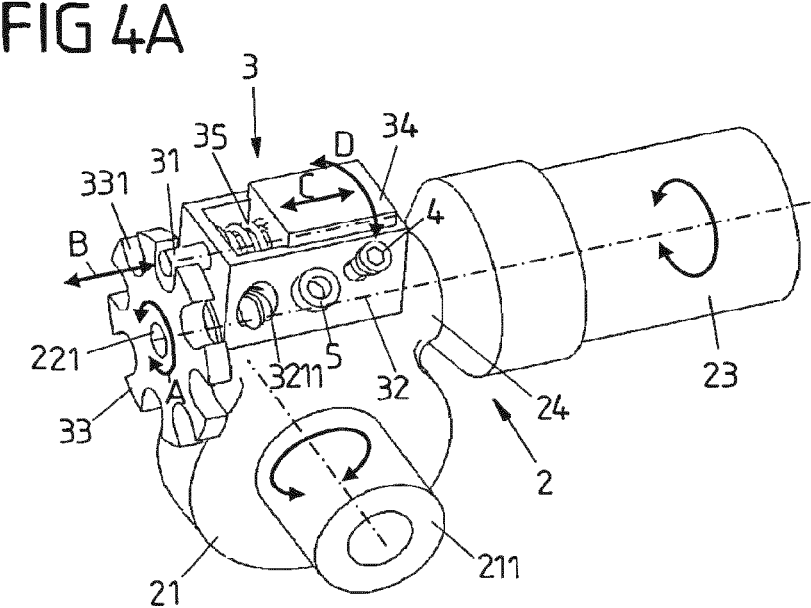
FIG. 4A shows the superposition drive of a steering wheel according to a third exemplary embodiment of the invention in a perspective representation.
Figure 4B:
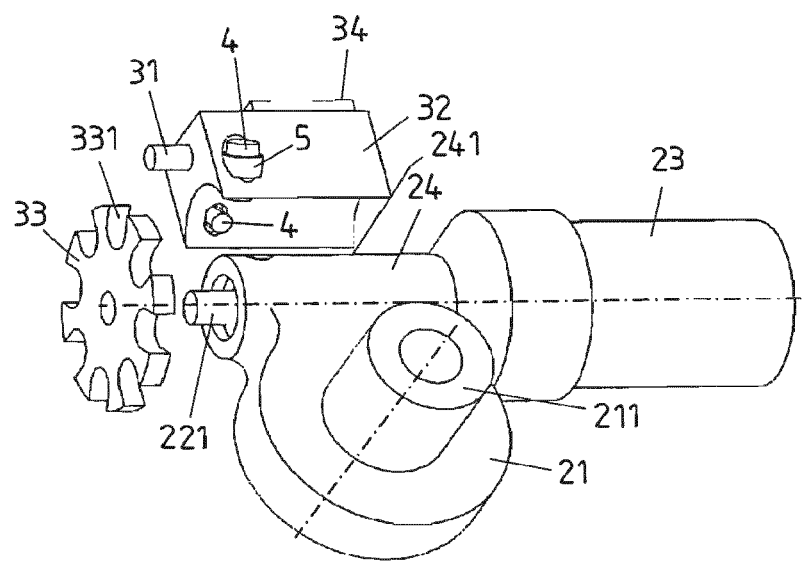
FIG. 4B shows the superposition drive of FIG. 4A in a perspective exploded representation.

FIGS. 4A and 4B show a superposition drive together with a locking means of a steering wheel in accordance with a further exemplary embodiment of the invention. In contrast to the exemplary embodiment of FIGS. 3A and 3B, the abutment surface 241 of the housing 24 of the superposition drive 3 does not extend flat, but curved as segment of a circular cylinder. Correspondingly, the side of the housing 32 of the locking means 3 facing the abutment portion 241 also is formed curved (complementary to the curvature of the abutment portion 241). The housing 32 is shown half open like in FIGS. 3A and 3B, so as not to conceal the components present in the housing interior. As mentioned, however, the housing usually is designed closed.

Furthermore, the housing 32 of the locking means 3 includes two through bores 3211, through which fastening screws 4 extend analogous to FIGS. 3A and 3B, which fix the housing 32 in the housing of the superposition drive. Both screws 4 each are guided through the through bores 3211 in an elastic sleeve 5, whereby an elastic bearing of the locking means 3 is realized on the superposition drive 2. FIG. 4A shows the combination of sleeve 5 and screw 4 (arranged on a side of the housing 32 facing the viewer) in an exploded representation.

The through bores 3211 are arranged symmetrically with respect to a plane in which the longitudinal axis of the locking bolt 31 and the longitudinal axis of the drive worm 22 extend. Due to the elastic bearing of the locking means 3 in the region of the screws 4 via the elastic sleeves 5, this arrangement provides for a linear compensating movement of the locking means 3 in direction of the longitudinal axis of the locking bolt 31 (arrow C) and at the same time also a rotatory compensating movement (arrow D) along the curved abutment portion 241 of the housing 24 of the superposition drive 2, i.e. about the longitudinal axis of the drive worm 22. The resulting compensating movement of the locking means 3 results from a superposition of the two described forms of movement. The bores 3211 in the side faces of the housing 32 of the locking means 3 extend towards the axis of the drive worm 22 and substantially at an angle of 90° to the same, so that they substantially vertically impinge on the abutment portion 241 of the housing 24 of the superposition drive 2.

Figure 5A:
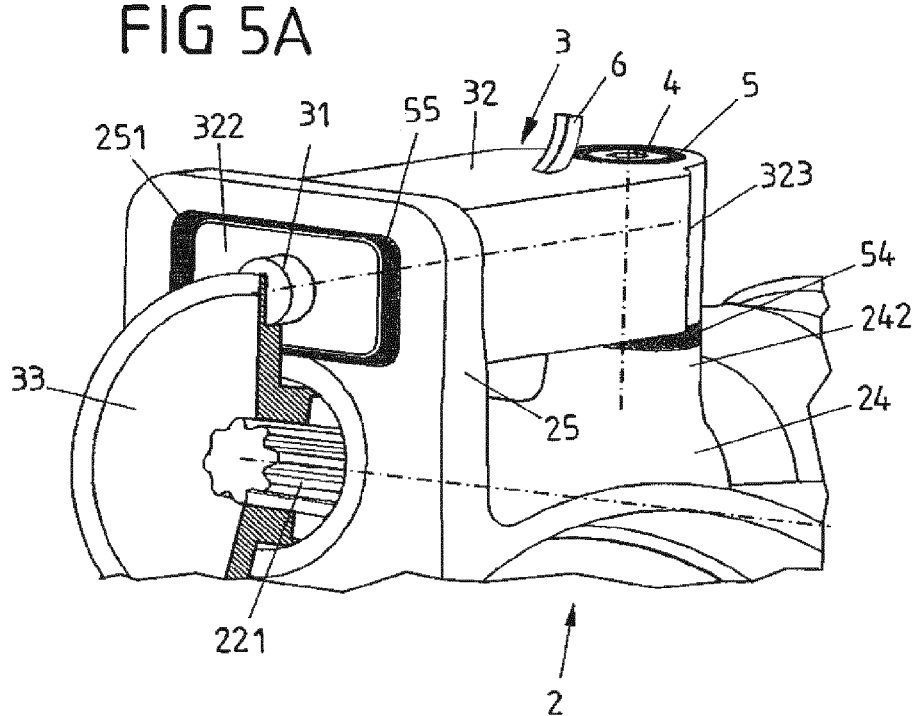
FIG. 5A shows the superposition drive and the locking means of a steering wheel according to a fourth exemplary embodiment of the invention in a perspective representation.
Figure 5B:
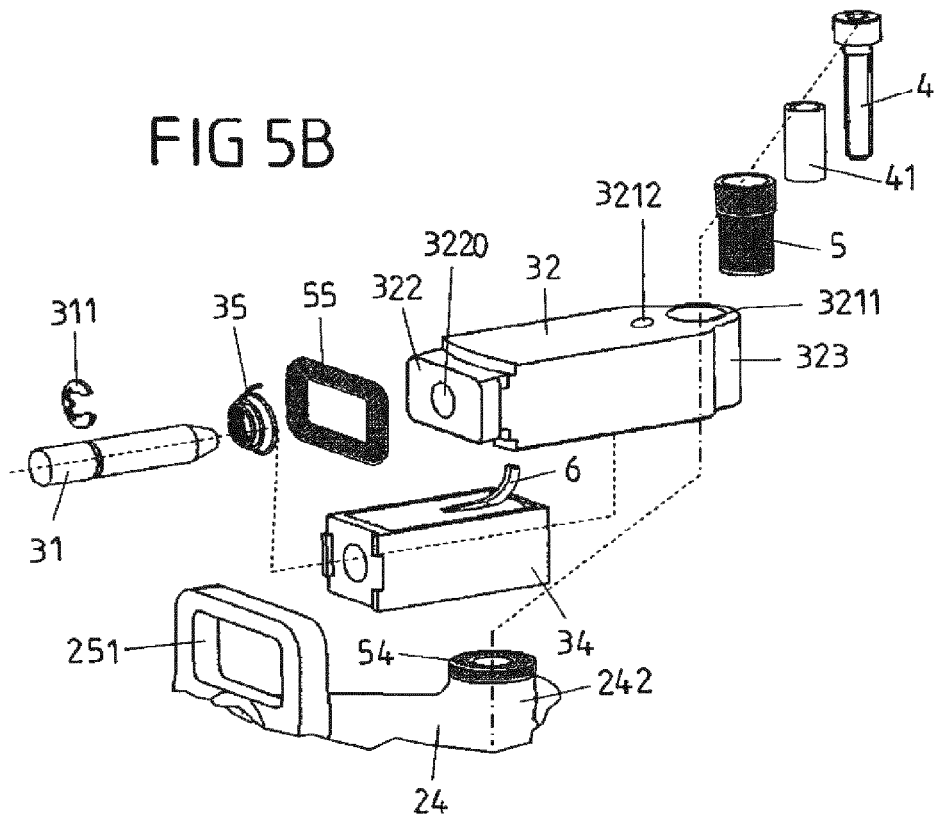
FIG. 5B shows the superposition drive and the locking means of FIG. 5A in an exploded representation.

FIGS. 5A and 5B relate to a further configuration of a superposition drive 2 of the steering wheel according to the invention. Accordingly, the housing 24 of the superposition drive 2 includes a holding portion 25, which at least approximately extends vertically (transversely) to the axis of the drive worm (not shown) of the superposition drive.

In the holding portion 25 a window-like cutout 251 is formed, into which an end-face portion 322 of the housing 32 of the locking means 3 protrudes and thus is mounted on the holding portion 25. In the portion 322 of the housing 3 the opening 3220 is formed, through which the bolt 31 of the locking means 3 protrudes out of the housing 32 in direction of the locking disk 33. The bolt 31 can be provided with a locking ring 311 which acts as stop, in order to limit the axial freedom of movement of the bolt, and at the same time serves as abutment for the compression spring 35. Between the complete inner edge of the cutout 251 of the holding portion 25 and the portion 322 of the housing 3, a (rectangular) elastic element 55 extends.

In addition, the housing 24 of the superposition drive 2 includes a dome-like connecting portion 242 which likewise at least approximately extends vertically (transversely) to the axis of the drive worm of the superposition drive and on which a portion 323 of the housing 32 of the locking means 3 rests, wherein the sides of the portion 323 and of the connecting portion 242 facing each other each are flattened. The housing 32 of the locking means 3 thus not only rests against the housing 24 of the superposition drive 2 with its entire bottom surface, but only sectionally in the region of the holding portion 25 and of the connecting portion 242.

The portion 323 is positioned along the longitudinal axis of the drive worm with a greater distance from the locking disk 33 than the portion 322. Between the portion 323 of the housing 32 and the connecting portion 242 a further elastic element formed as ring disk 54 is provided.

The contour of the portion 323 of the housing 32 in part is designed as semi-cylindrical bulge, wherein the contour of the bulge is aligned with the contour of the connecting portion 242 of the housing 24.

The locking means 3 and the superposition drive 2 are designed such that the axes of the locking bolt 31 and of the drive worm extend obliquely to each other. In a modification of the exemplary embodiment of FIGS. 5A and 5B, the locking bolt and the drive worm extend parallel to each other, wherein e.g. the height (measured transversely to the drive worm) of the connecting portion 242 can be dimensioned correspondingly.

In the portion 323 a cutout in the form of a through bore 3211 is provided, through which a fastening element in the form of a screw 4 extends, which is screwed e.g. into a threaded bore of the connecting portion 242. Analogous to FIGS. 3A, 3B an elastic element in the form of an elastic sleeve 5 is located between the edge of the through bore 3211, wherein the screw 4 reaches through the elastic sleeve 5 and an opening in the ring disk 54. In the present case, the elastic sleeve 5 includes a stepped outer and inner contour adapted to the through bore 3211 and the screw 4, respectively.

In addition, a spacer sleeve 41 is provided, which surrounds the shaft of the screw 4 and which likewise runs into the threaded bore of the connecting portion 242 through the elastic sleeve 5 and the ring disk 54. In the mounted condition of the arrangement of locking means 3 and superposition transmission, the spacer sleeve 41 is braced (fixed) between the screw head of the screw 4 and the connecting portion 242, wherein the length of the spacer sleeve 41 is chosen such that the clearance between the housing 32 of the locking means 3 and the housing 24 of the superposition transmission provides for a sufficient compensating movement between the locking means 3 and the superposition drive 2, against the action of force of the pretensioned elastic elements 5, 54 and 55.

The bearing of the housing 32 of the locking means 3 on the housing 24 of the superposition transmission 2 via the elastic elements 5, 54 and 55 here provides for a compensating movement of the locking means 3 in principle in an arbitrary direction.

The housing 32 of the locking means 3 also includes an opening 3212 through which an electric connecting line 6 is guided, which is connected with the actuator 34 of the locking means 3.

It should be noted that elements of the exemplary embodiments described above can of course also be used in combination with each other. For example, the symmetrical arrangement of the fastening screws of FIGS. 4A and 4B might also be used with an abutment portion 241 of the housing 24 of the superposition drive 2, which is designed flat as shown in FIGS. 3A and 3B.

Figure 6:
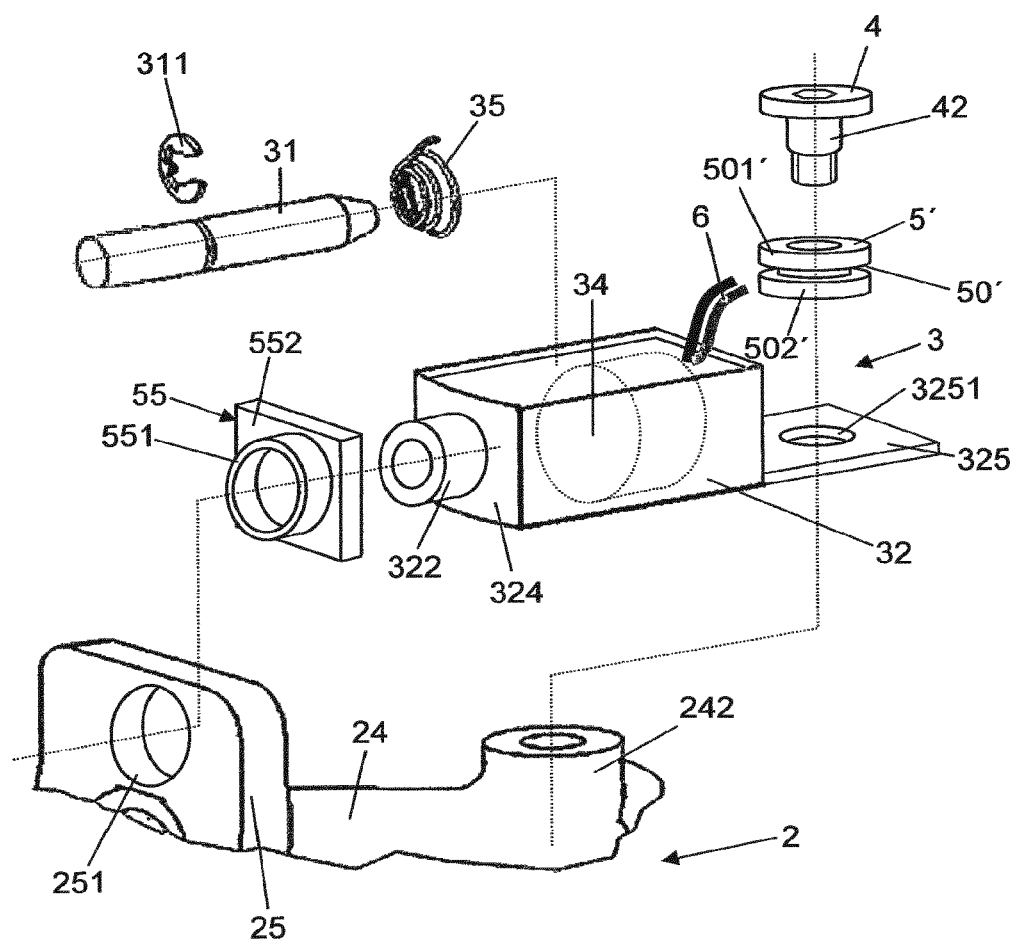
FIG. 6 shows a modification of the superposition drive and the locking means of FIGS. 5A and 5B.

FIG. 6 relates to a modification of the superposition drive 2 and of the locking means 3 of FIGS. 5A and 5B. The cutout 251 in the holding portion 25 of the housing 24 of the superposition drive 2 here is formed as circular through opening. Correspondingly, the portion 322 protruding into the cutout 25 and protruding from an end face 324 of the housing 32 of the locking means 3 has a circular cylindrical shape.

The circular cylindrical portion 322 of the housing 32 is surrounded by an elastic element 55 as part of the bearing means, wherein the elastic element 55 includes a (hollow) circular cylindrical portion 551 and a (substantially rectangular) flange portion 552 protruding therefrom. In the mounted condition, as seen in direction of action of the locking bolt 31, the flange portion 552 is located between the end face 324 of the housing 32 and the holding portion 25 of the housing 24. Thus, in the mentioned direction of action (along the locking bolt 31) the housing 32 of the locking means 3 also is mounted elastically with respect to the holding portion 25 of the housing 24 of the superposition drive 2.

A further difference to FIGS. 5A and 5B consists in that the actuator 34 of the locking means 3 does not have its own housing, but merely is arranged in the housing 32 together with the locking bolt 31, the compression spring 35 and the locking ring 311 of the locking means 3. The locking bolt 31, the compression spring 35 and the locking ring 311 in particular are formed as explained with respect to the preceding FIGS. Correspondingly, the locking means 3 also includes a locking disk (as rotatable element) cooperating with the locking bolt 31 (as locking element) in the locking position, which is however not shown in FIG. 6.

On a side facing away from the holding portion 25, the housing 32 of the locking means 3 in addition is provided with a portion 325 in the form of a (in particular substantially planar) tab which includes a through bore 3251. In the mounted condition, a screw 4 protrudes through the through bore 3251 and is connected with the connecting portion 242 of the housing 24 of the superposition drive 2. The screw 4 is designed with a shoulder 42 without thread, which performs the function of the spacer sleeve 41 in the exemplary embodiment of FIGS. 5A and 5B.

The bearing means furthermore include a sleeve-like elastic element 5', which has two disk-shaped regions 501', 502' separated by a circumferential ring-shaped groove 50'. The edge of the through bore 3251 engages into the annular groove 50', so that one of the disk-shaped regions 501', 502' each is located on one side of the tab-like portion 325. In particular, the lower one (the region 502') of the two regions 501', 502' is located between a bottom surface of the tab-like portion 325 facing the connecting portion 242 and the connecting portion 242, so that the housing 32 of the locking means 3 is elastically mounted on the housing 24 of the superposition drive 2 also in the region of the connecting portion 242 and the screw 4.

The invention claimed is:

1. A steering wheel for a motor vehicle, comprising:
a steering wheel rim, via which the steering wheel can be actuated by a driver of the motor vehicle for generating a steering angle;
a superposition drive for generating a steering angle which can be superimposed with the steering angle generated by actuating the steering wheel rim;
a locking means in addition to the superposition drive, with which the superposition drive can be locked by mechanical action; and
bearing means, by which a housing of the locking means is elastically mounted on a housing of the superposition drive, such that the housing of the locking means can perform a compensating movement relative to the housing of the superposition drive.

2. The steering wheel according to claim 1, wherein the superposition drive includes a drive worm meshing with a worm gear and arranged in the housing of the superposition drive, wherein the locking means is arranged on an abutment portion of the housing of the superposition drive.

3. The steering wheel according to claim 2, wherein the drive worm is elastically mounted in the housing of the superposition drive via the bearing means.

4. The steering wheel according to claim 1, wherein the locking means includes a locking element, for mechanically locking the superposition drive, and an actuator arrangement for moving the locking element from a release position into a locking position and vice versa, wherein the locking element and/or the actuator arrangement are arranged in the housing of the locking means.

5. The steering wheel according to claim 4, wherein the housing of the locking means is arranged on an abutment portion of the housing of the superposition drive and mounted via the bearing means such that the housing of the locking means can perform a compensating movement relative to the housing of the superposition drive.

6. The steering wheel according to claim 4, wherein the locking means is fixed on the superposition drive via at least one fastening element which extends through a cutout in the housing of the locking means, wherein the bearing means comprise at least one elastic element which extends between the fastening element and an inside of the cutout facing the fastening element.

7. The steering wheel according to claim 1, wherein the housing of the superposition drive includes a holding portion extending obliquely or transversely to a longitudinal axis of a drive worm of the superposition drive, in which a cutout is formed, into which a portion of the housing of the locking means protrudes, wherein the bearing means comprise at least one elastic element which is arranged between the holding portion and the portion of the housing of the locking means protruding into the cutout.

8. The steering wheel according to claim 7, wherein the housing of the superposition drive further includes a connecting portion extending obliquely or transversely to the longitudinal axis of the drive worm, wherein the bearing means further comprise at least one elastic element via which another portion of the housing of the locking means rests on the connecting portion.

9. The steering wheel according to claim 8, wherein in the portion of the housing of the locking means resting on the connecting portion another cutout is formed, through which a fastening element extends, via which the locking means is fixed on the superposition drive, wherein the bearing means further comprise at least one elastic element which extends between the fastening element and an inside of the cutout facing the fastening element.

10. The steering wheel according to claim 1, wherein the bearing means comprise at least one elastic element which extends between the housing of the superposition drive and the housing of the locking means.

11. The steering wheel according to claim 1, wherein the superposition drive includes a drive worm meshing with a worm gear and the locking means includes a locking element for locking the superposition drive, wherein a longitudinal axis of the drive worm and a main direction of extension of the locking element are oriented parallel to each other.

12. The steering wheel according to claim 1, wherein the superposition drive includes a drive worm meshing with a worm gear and the locking means includes a locking element for locking the superposition drive, wherein the axis of the drive worm and the main direction of extension of the locking element are oriented obliquely to each other.

* * * * *